US010447458B2

United States Patent
Chang et al.

(10) Patent No.: US 10,447,458 B2
(45) Date of Patent: Oct. 15, 2019

(54) RADIO-FREQUENCY FRONT-END ARCHITECTURE FOR CARRIER AGGREGATION OF CELLULAR BANDS

(71) Applicant: SKYWORKS SOLUTIONS, INC., Woburn, MA (US)

(72) Inventors: Ethan Chang, Aliso Viejo, CA (US); Roman Zbigniew Arkiszewski, Oak Ridge, NC (US); John G Freed, Raleigh, NC (US); Edward James Anthony, Robins, IA (US); Reza Kasnavi, Solana Beach, CA (US)

(73) Assignee: Skyworks Solutions, Inc., Woburn, MA (US)

( * ) Notice: Subject to any disclaimer, the term of this patent is extended or adjusted under 35 U.S.C. 154(b) by 113 days.

(21) Appl. No.: 14/824,161

(22) Filed: Aug. 12, 2015

(65) Prior Publication Data
US 2016/0050665 A1     Feb. 18, 2016

Related U.S. Application Data (60) Provisional application No. 62/036,844, filed on Aug. 13, 2014.

(51) Int. Cl.
*H04W 72/04*     (2009.01)
*H04L 5/14*      (2006.01)
(Continued)

(52) U.S. Cl.
CPC ............. *H04L 5/14* (2013.01); *H04B 1/48* (2013.01); *H04L 5/001* (2013.01); *H04L 5/1469* (2013.01)

(58) Field of Classification Search
CPC ......... H04L 5/001; H04L 5/14; H04L 5/1469; H04L 5/0001; H04B 1/48; H04B 1/50
See application file for complete search history.

(56) References Cited

U.S. PATENT DOCUMENTS

| 2004/0121753 A1* | 6/2004 | Sugar ............ H04B 1/005 455/333 |
| 2006/0121937 A1* | 6/2006 | Son ............... H04B 1/0053 455/553.1 |

(Continued)

FOREIGN PATENT DOCUMENTS

| JP | 2006-166277 | 6/2006 |
| JP | 2010-114837 | 5/2010 |

(Continued)

*Primary Examiner* — Hoang-Chuong Q Vu
(74) *Attorney, Agent, or Firm* — Chang & Hale LLP (57) ABSTRACT

Circuits and methods related to radio-frequency (RF) architectures having carrier aggregation. In some implementations, a carrier aggregation (CA) architecture can include a duplexer configured to provide duplexing functionality for a first frequency band and a second frequency band with a common antenna. The CA architecture can further include a first amplification path and a second amplification path coupled to respective ports of the duplexer, each of the first amplification path and the second amplification path configured to amplify a signal in its respective frequency band, each amplification path including a transmit/receive (TX/RX) switch configured to provide time-division duplexing (TDD) functionality for the amplified signal and a received signal. In some implementations, the first frequency band includes a B39 band, and the second frequency band includes a B41 band.

17 Claims, 5 Drawing Sheets

(51) Int. Cl.
*H04L 5/00* (2006.01)
*H04B 1/48* (2006.01)

(56) References Cited

U.S. PATENT DOCUMENTS

| | | | | |
|---|---|---|---|---|
| 2006/0276158 | A1* | 12/2006 | Okabe | H04B 1/38 |
| | | | | 455/333 |
| 2007/0243832 | A1* | 10/2007 | Park | H04B 1/006 |
| | | | | 455/73 |
| 2008/0192855 | A1* | 8/2008 | Shapira | G01S 3/023 |
| | | | | 375/267 |
| 2008/0212502 | A1* | 9/2008 | Zhen | H03F 1/0277 |
| | | | | 370/295 |
| 2010/0117713 | A1* | 5/2010 | Katoh | H03K 17/693 |
| | | | | 327/427 |
| 2011/0299632 | A1* | 12/2011 | Mirzaei | H04B 1/006 |
| | | | | 375/340 |
| 2012/0243447 | A1* | 9/2012 | Weissman | H04B 1/0458 |
| | | | | 370/280 |
| 2013/0043946 | A1* | 2/2013 | Hadjichristos | H04B 1/0057 |
| | | | | 330/252 |
| 2013/0163577 | A1 | 6/2013 | Feng | |
| 2013/0250819 | A1 | 9/2013 | Khlat et al. | |
| 2014/0016525 | A1* | 1/2014 | Yoshizawa | H04Q 1/50 |
| | | | | 370/294 |
| 2014/0073268 | A1 | 3/2014 | Taniuchi et al. | |
| 2014/0086162 | A1 | 3/2014 | Rimini et al. | |
| 2014/0254568 | A1* | 9/2014 | Maruyama | H04J 3/02 |
| | | | | 370/336 |
| 2014/0295775 | A1* | 10/2014 | Rousu | H04B 1/006 |
| | | | | 455/73 |
| 2014/0321339 | A1* | 10/2014 | Pehlke | H04L 5/14 |
| | | | | 370/281 |
| 2014/0378075 | A1* | 12/2014 | Verma | H04B 7/12 |
| | | | | 455/77 |
| 2015/0318975 | A1* | 11/2015 | Lim | H04L 5/001 |
| | | | | 370/275 |
| 2015/0358791 | A1* | 12/2015 | Wang | H04L 29/06 |
| | | | | 370/328 |
| 2015/0372702 | A1* | 12/2015 | Asuri | H04B 1/1027 |
| | | | | 455/77 |
| 2016/0013923 | A1* | 1/2016 | Malaga | H04L 5/14 |
| | | | | 370/277 |
| 2017/0126257 | A1* | 5/2017 | Wang | H04B 1/0064 |

FOREIGN PATENT DOCUMENTS

| | | |
|---|---|---|
| JP | 2012-514387 | 6/2012 |
| TW | 201328174 | 7/2013 |
| WO | 2013/024370 | 2/2013 |

\* cited by examiner

RADIO-FREQUENCY FRONT-END ARCHITECTURE FOR CARRIER AGGREGATION OF CELLULAR BANDS

CROSS-REFERENCE TO RELATED APPLICATION(S)

This application claims priority to U.S. Provisional Application No. 62/036,844 filed Aug. 13, 2014, entitled RADIO-FREQUENCY FRONT-END ARCHITECTURE FOR CARRIER AGGREGATION OF CELLULAR BANDS, the disclosure of which is hereby expressly incorporated by reference herein in its entirety.

BACKGROUND

Field

The present disclosure relates to carrier aggregation in radio-frequency applications.

Description of the Related Art

In some radio-frequency (RF) applications, cellular carrier aggregation (CA) can involve two or more RF signals being processed through a common path. For example, carrier aggregation can involve use of a path for a plurality of bands having frequency ranges that are sufficiently separated. In such a configuration, simultaneous operation of more than one band can be achieved.

SUMMARY

In accordance with a number of implementations, the present disclosure relates to a carrier aggregation (CA) architecture that includes a duplexer configured to provide duplexing functionality for a first frequency band and a second frequency band with a common antenna. The CA architecture further includes an a first amplification path and a second amplification path coupled to respective ports of the duplexer, each of the first amplification path and the second amplification path configured to amplify a signal in its respective frequency band, each amplification path including a transmit/receive (TX/RX) switch configured to provide time-division duplexing (TDD) functionality for the amplified signal and a received signal.

In some implementations, the first frequency band includes a B39 band.

In some implementations, the second frequency band includes a B41 band.

In some implementations, the CA architecture further includes an antenna switch module coupled to a node of the duplexer.

In some implementations, each of the first amplification path and the second amplification path include a band-selection switch.

In some implementations, the first amplification path includes a controller configured to provide one or more control functionalities for the operation of the first amplification path.

In some implementations, the first amplification path includes a power amplifier and a bias port configured to bias the power amplifier.

In some implementations, the TX/RX switch includes a common node coupled to the duplexer for TX and RX signals.

In some implementations, the present disclosure relates to a radio-frequency (RF) module that includes a packaging substrate configured to receive a plurality of components. The RF module further includes a carrier aggregation (CA) architecture implemented on the packaging substrate, the CA architecture including a duplexer configured to provide duplexing functionality for a first frequency band and a second frequency band with a common antenna, the CA architecture further including a first amplification path and a second amplification path coupled to respective ports of the duplexer, each of the first amplification path and the second amplification path configured to amplify a signal in its respective frequency band, each amplification path including a transmit/receive (TX/RX) switch configured to provide time-division duplexing (TDD) functionality for the amplified signal and a received signal.

In some implementations, the RF module is a power amplifier (PA) module.

In some implementations, the RF module is a front-end module (FEM).

In some implementations, the first frequency band includes a B39 band and the second frequency band includes a B41 band.

In some implementations, the CA architecture further includes an antenna switch module coupled to a node of the duplexer.

In some implementations, each of the first amplification path and the second amplification path include a band-selection switch.

In some implementations, the first amplification path includes a controller configured to provide one or more control functionalities for the operation of the first amplification path.

In some implementations, the first amplification path includes a power amplifier and a bias port configured to bias the power amplifier.

In some implementations, the TX/RX switch includes a common node coupled to the duplexer for TX and RX signals.

According to some teachings, the present disclosure relates to a radio-frequency (RF) device that includes a transceiver configured to process RF signals. The RF device further includes an RF module in communication with the transceiver, the RF module having a carrier aggregation (CA) architecture, the CA architecture including a duplexer configured to provide duplexing functionality for a first frequency band and a second frequency band with a common antenna, the CA architecture further including a first amplification path and a second amplification path coupled to respective ports of the duplexer, each of the first amplification path and the second amplification path configured to amplify a signal in its respective frequency band, each amplification path including a transmit/receive (TX/RX) switch configured to provide time-division duplexing (TDD) functionality for the amplified signal and a received signal.

In some implementations, the RF device includes a wireless device.

In some implementations, the wireless device is a cellular phone.

In some implementations, the first frequency band includes a B39 band and the second frequency band includes a B41 band.

In some implementations, the CA architecture further includes an antenna switch module coupled to a node of the duplexer.

In some implementations, each of the first amplification path and the second amplification path include a band-selection switch.

In some implementations, the first amplification path includes a controller configured to provide one or more control functionalities for the operation of the first amplification path.

In some implementations, the first amplification path includes a power amplifier and a bias port configured to bias the power amplifier.

In some implementations, the TX/RX switch includes a common node coupled to the duplexer for TX and RX signals.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

So that the present disclosure can be understood in greater detail, a more particular description may be had by reference to the features of various implementations, some of which are illustrated in the appended drawings. The appended drawings, however, merely illustrate the more pertinent features of the present disclosure and are therefore not to be considered limiting, for the description may admit to other effective features.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION OF SOME IMPLEMENTATIONS

The headings provided herein, if any, are for convenience only and do not necessarily affect the scope or meaning of the claimed invention.

Cellular carrier aggregation (CA) can be supported by allowing two or more radio-frequency (RF) signals to be processed through a common path. For example, carrier aggregation can involve use of a path for a plurality of bands having frequency ranges that are sufficiently separated. In such a configuration, simultaneous operation of more than one band is possible.

In some implementations, the present disclosure relates to a front-end architecture that can be configured to support CA of two or more cellular bands. Various examples are described herein in the context of cellular bands B39 and B41 (e.g., as allocated for China Mobile network); however, it will be understood that one or more features of the present disclosure can also be implemented with other bands.

In some implementations, a front-end architecture having CA capability for the example bands of B39 having a frequency range of 1.880 to 1.920 GHz and B41 having a frequency range of 2.496 to 2.690 GHz can be implemented with a reduced component count, lower bill-of-materials (BoM) cost, and/or better RF performance. In some implementations, such an architecture can also be configured to support some or all of other carrier aggregation scenarios defined for a given mobile network.

In some implementations, CA is an evolution of the Long-Term Evolution (LTE) technology to increase data throughput. By aggregating two available spectra at the same or different frequency bands, the combined signal bandwidth can expand to allow transferring of more data at the same time. In one or more mobile networks, TD-LTE has been adopted as a 4G standard, and bands B39, B40 and B41 have been allocated.

In the example context of carrier aggregation of B39 band having a frequency range of 1.880 to 1.920 GHz and the B41 band having a frequency range of 2.496 to 2.690 GHz, technical challenges can arise. For example, due to the timing synchronization difficulty from two different towers to the handset and dynamically UL/DL (uplink/downlink) configuration adjustment being allowed, the transmit slot of one band could overlap in time with receive slot of the other band. In order to transmit and receive the signal from two bands at the same time, conventional architecture is to use two separate antennas for B39 and B41. Such a conventional architecture typically suffers from higher BoM costs and longer calibration procedures.

As described herein, one or more features of the present disclosure can provide a front-end architecture having a B39 TX/RX switch design to enable a single antenna design, as well as eliminating the need for a B39 RX filter. Such a front-end architecture can be implemented with a lower BoM cost and better performance.

Figure 1:
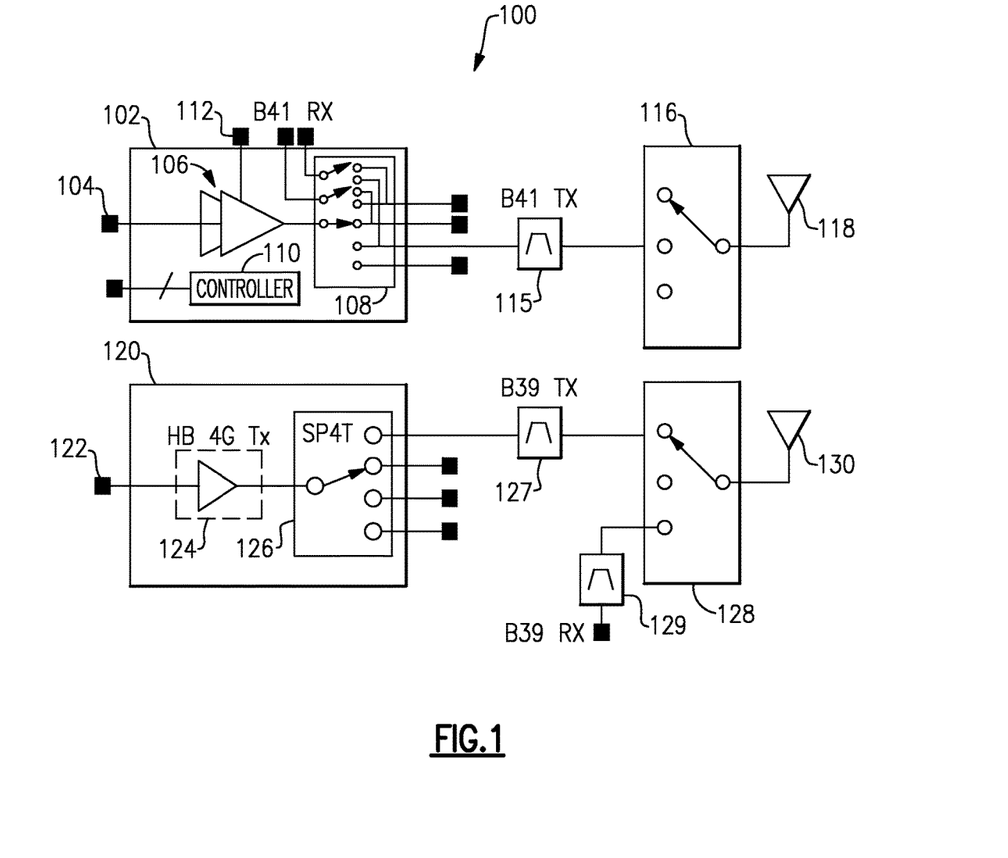
FIG. 1 is a schematic diagram of an example front-end architecture according to some implementations.

FIG. 1 shows an example of a front-end architecture 100 configured to operate with two antennas 118, 130 for the example bands B39 and B41 according to some implementations. More particularly, a power amplifier (PA) path 120 is shown to be configured to provide B39 TX operation, where an input signal to be amplified is provided at an input node 122. A PA 124 (e.g., associated with a high-band (HB) 4G signal) can amplify such an input signal, and the amplified signal is shown be provided to a band-selection switch 126 (e.g., a single-pull four-throw (SP4T) switch) configured to allow B39 TX operation. A B39 TX filter 127 is shown to be provided between the band-selection switch 126 and an antenna switch module (ASM) 128. When the ASM 128 is operated in the B39 TX mode, the amplified and filtered RF signal can be routed to the antenna 130 for transmission. When the ASM 128 is operated in the B39 RX mode, a signal received through the antenna 130 can be routed to, for example, a low-noise amplifier (LNA) through a B39 RX filter 129.

A PA path 102 is shown to be configured to facilitate B41 TX and B41 RX operations. An input signal to be amplified is provided at an input node 104. A PA 106 can amplify such an input signal, and the amplified signal is shown be provided to a band/mode selection switch 108 configured to allow B41 TX/RX operations. A B41 TX filter 115 is shown to be provided between the band/mode selection switch 108 and an antenna switch module (ASM) 116. When the ASM 116 is operated in the B41 band, the amplified and filtered RF signal can be routed to the antenna 118 for transmission. When in the B41 TX mode, the band/mode selection switch 108 is shown to route the amplified signal to the B41 TX filter. When in the B41 RX mode, a signal received through the antenna 118 can be routed to the band/mode selection switch 108 through the ASM 116. The band/mode selection switch 108 can then route the received signal to, for example, a low-noise amplifier (LNA) through a B41 RX node.

In the example of FIG. 1, a controller 110 is shown to provide one or more control functionalities for the operation of the B41 amplification path 102. Further, the PA 106 is shown to be biased through a bias node 112. Such control and biasing functionalities can also be provided for the B39 amplification path 120. In some implementations, the foregoing example of a two-antenna system for B39 and B41 bands can be bulky and have relatively high cost.

Figure 2:
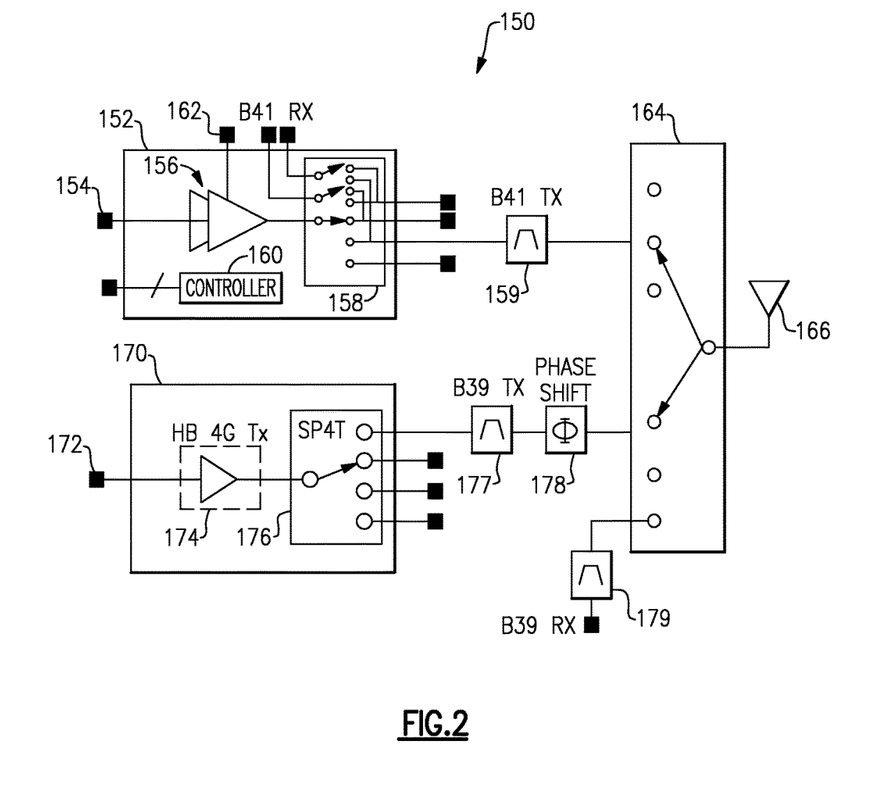
FIG. 2 is a schematic diagram of another example front-end architecture according to some implementations.

FIG. 2 shows an example of a front-end architecture 150 configured to operate with a single antenna 166 for the example bands B39 and B41 according to some implementations. More particularly, a power amplifier (PA) path 170 is shown to be configured to provide B39 TX operation, where an input signal to be amplified is provided at an input node 172. A PA 174 (e.g., associated with a high-band (HB) 4G signal) can amplify such an input signal, and the amplified signal is provided to a band-selection switch 176 (e.g., a single-pull four-throw (SP4T) switch) configured to allow B39 TX operation. A B39 TX filter 177 is shown to be provided between the band-selection switch 176 and an antenna switch module (ASM) 164. A phase shifting circuit 178 is shown to be provided between the B39 TX filter 177 and the ASM 164.

A PA path 152 is shown to be configured to facilitate B41 TX and B41 RX operations. An input signal to be amplified is provided at an input node 154. A PA 156 can amplify such an input signal, and the amplified signal is shown be provided to a band/mode selection switch 158 configured to allow B41 TX/RX operations. A B41 TX filter 159 is shown to be provided between the band/mode selection switch 108 and the ASM 164.

In the example of FIG. 2, the ASM 164 can be configured as a multi-close switch to allow CA operations of the B39 and B41 bands with the single antenna 166. For the B39 band, the ASM 164 can be operated to facilitate the TX operation through the foregoing PA path 170 and the RX operation through a B39 RX filter 179. For the B41 band, the amplified and filtered RF signal can be routed to the antenna 166 for transmission through the band selection switch 158 and the ASM 164, when in the B41 TX mode. When in the B41 RX mode, a signal received through the antenna 166 can be routed to the band/mode selection switch 158 through the ASM 166. The band/mode selection switch 158 can then route the received signal to, for example, a low-noise amplifier (LNA) through a B41 RX node.

In the example of FIG. 2, a controller 160 is shown to provide one or more control functionalities for the operation of the B41 amplification path 152. Further, the PA 156 is shown to be biased through a bias node 162. Such control and biasing functionalities can also be provided for the B39 amplification path 170.

In the foregoing example of FIG. 2, the phase shift provided by the phase shifting circuit 178 typically needs to be optimized or tuned to obtain desired system performance. Such optimization can be challenging, especially on small form factor boards such as a phone board. Further, RF performance can be easily degraded if optimized phase is not maintained.

In some implementations, a front-end architecture can include a switch configured to allow transmit and receive operations through a common node, but enables at different times. Along with such a switch, a B39/B41 duplexer can be implemented as described herein. Such a configuration can allow the front-end architecture to support some or all CA combinations with a single antenna, with a simpler implementation and elimination of a B39 RX filter.

Figure 3:
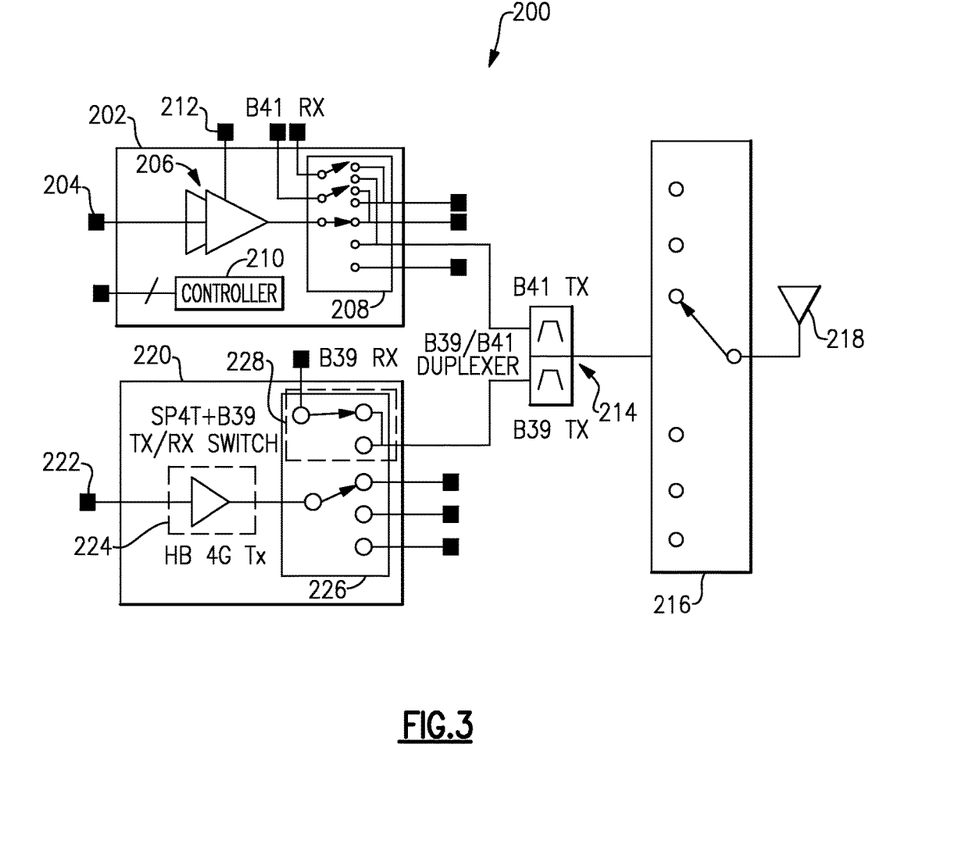
FIG. 3 is a schematic diagram of yet another example front-end architecture according to some implementations.

FIG. 3 shows an example configuration 200 of a front-end architecture implemented on a multi-mode multi-band (MMMB) power amplifier module (PAM) according to some implementations. It will be understood that one or more features of such a front-end architecture can also be implemented in other types of modules or products.

While pertinent features are shown, those of ordinary skill in the art will appreciate from the present disclosure that various other features have not been illustrated for the sake of brevity and so as not to obscure more pertinent aspects of the example implementations disclosed herein. To that end, referring to the configuration 200 of FIG. 3, a power amplifier (PA) path 220 is shown to be configured to facilitate B39 TX and RX operations. An input signal to be amplified is provided at an input node 222. A PA 224 can amplify such an input signal, and the amplified signal is shown be provided to a band-selection switch 226 configured to allow B39 TX operation. A B39/B41 duplexer 214 is shown to be provided between the band-selection switch 226 and an antenna switch module (ASM) 216.

In FIG. 3, the band-selection switch 226 is shown to include a TX/RX switch 228 that facilitates the TX and RX operations for the B39 band. For example, during a TX operation, the switch 228 can be operated so that the output of the PA 224 is connected to a common node associated with the B39 portion of the duplexer 214, and the B39 RX node is disconnected from the common node. During an RX operation, the switch 228 can be operated so that the output of the PA 224 is disconnected from the common node, and the B39 RX node is connected to the common node. In some implementations, the TX/RX switch 228 is configured to provide time-division duplexing (TDD) functionality for the amplified B39 TX signal and the B39 RX signal.

Referring to the configuration 200 of FIG. 3, a PA path 202 is shown to be configured to facilitate B41 TX and B41 RX operations. An input signal to be amplified is provided at an input node 204. A PA 206 can amplify such an input signal, and the amplified signal is shown be provided to a band/mode selection switch 208 configured to allow B41 TX/RX operations. The B39/B41 duplexer 214 is shown to be provided between the band/mode selection switch 208 and the ASM 216.

During a TX operation, the switch 208 can be operated so that the output of the PA 206 is connected to a common node associated with the B41 portion of the duplexer 214, and the B41 RX node is disconnected from the common node. During an RX operation, the switch 208 can be operated so that the output of the PA 206 is disconnected from the common node, and the B41 RX node is connected to the common node. In some implementations, at least a portion of the switch 208 is a TX/RX switch that is configured to provide time-division duplexing (TDD) functionality for the amplified B41 TX signal and the B41 RX signal.

In the example of FIG. 3, a controller 210 is shown to provide one or more control functionalities for the operation of the B41 amplification path 202. Further, the PA 206 is shown to be biased through a bias node 212. Such control and biasing functionalities can also be provided for the B39 amplification path 220.

In the example of FIG. 3, the ASM 216 is shown to allow routing of a path between the B39/B41 duplexer 214 and a common antenna 218. A carrier aggregation of the B39 and B41 bands in the foregoing example manner can achieve similar functionality as in the example of FIG. 2, but with a lower component count, easier implementation, better performance, and a lower BoM cost.

Figure 4:
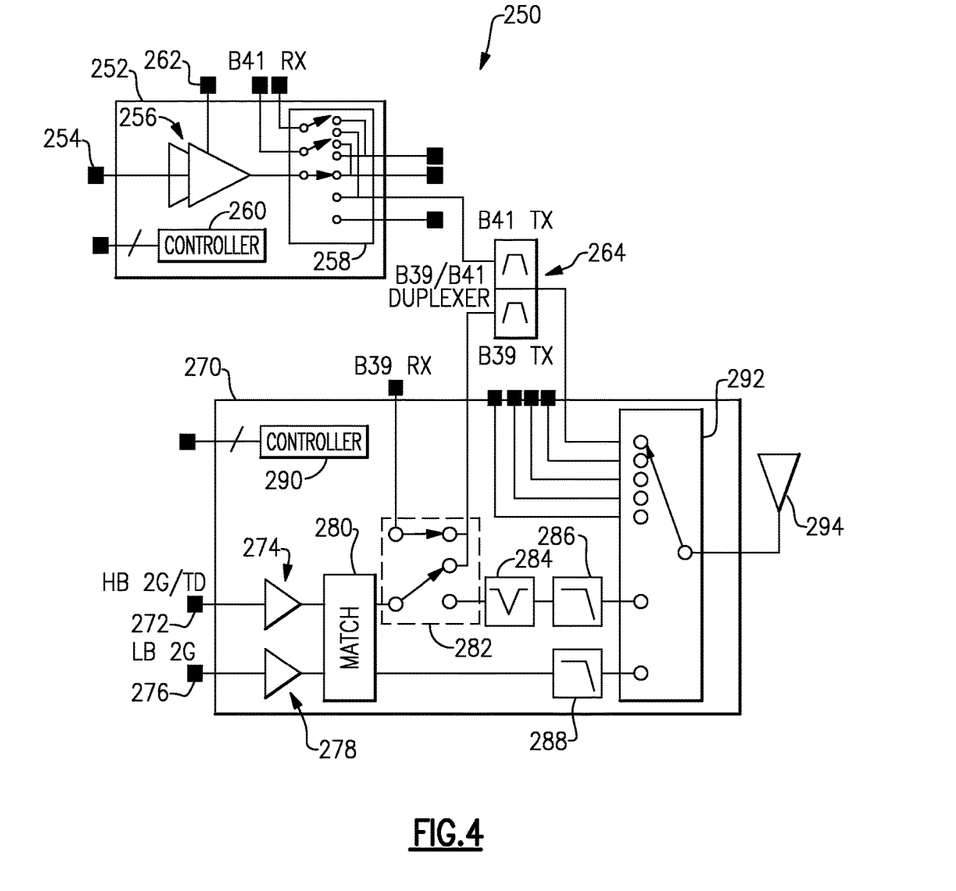
FIG. 4 is a schematic diagram of yet another example front-end architecture according to some implementations.

FIG. 4 shows an example configuration 250 of a front-end architecture implemented on a TX front-end module (FEM) according to some implementations. It will be understood that one or more features of such a front-end architecture can also be implemented in other types of modules or products.

While pertinent features are shown, those of ordinary skill in the art will appreciate from the present disclosure that various other features have not been illustrated for the sake of brevity and so as not to obscure more pertinent aspects of the example implementations disclosed herein. To that end, referring to the configuration 250 of FIG. 4, a power amplifier (PA) path 270 is shown to be configured to facilitate B39 TX and RX operations. An input signal (e.g., associated with a high-band (HB) 2G/TD signal) to be amplified is shown to be provided through an input node 272. A PA 274 can amplify such an input signal, and the amplified signal is shown be provided to matching network 280. The input node 272 and the PA 274 can be configured to support multiple frequency bands, including the example B39 TX band. In the example shown, other band(s) can include a high-band (HB) signal for 2G/TD operation. For 2G operation, a low-band (LB) signal is shown to be provided to a PA 278 through an input node 276, and the amplified signal from the PA 278 is shown to be provided to the matching network 280.

In the example of FIG. 4, a TX/RX switch 282 is shown to be implemented to facilitate the TX and RX operations for the B39 band. For example, during a TX operation, the switch 282 can be operated so that the output of the PA 274 is connected to a common node associated with the B39 portion of the duplexer 264, and the B39 RX node is disconnected from the common node. During an RX operation, the TX/RX switch 282 can be operated so that the output of the PA 274 is disconnected from the common node, and the B39 RX node is connected to the common node. In some implementations, the TX/RX switch 282 is configured to provide time-division duplexing (TDD) functionality for the amplified B39 TX signal and the B39 RX signal.

The TX/RX switch 282 can further be configured to allow routing of other non-B39 band(s) associated with the PA 274. For example, the switch 282 can be operated so that the output of the PA 274 is routed to filters 284, 286. In another example, the output PA 278 is routed to filter 288. In some implementations, the switch 282 can optionally be operated so that the output PA 278 is routed to filter 288 (not shown). In the example of FIG. 4, a controller 290 is shown to provide one or more control functionalities for the operation of the B39 amplification path 270.

Referring to the configuration 250 of FIG. 4, a PA path 252 is shown to be configured to facilitate B41 TX and B41 RX operations. An input signal to be amplified is provided at an input node 254. A PA 256 can amplify such an input signal, and the amplified signal is shown to be provided to a band/mode selection switch 258 configured to allow B41 TX/RX operations. The B39/B41 duplexer 264 is shown to be provided between the band/mode selection switch 258 and an antenna switch module (ASM) 292. In some implementations, at least a portion of the switch 258 is a TX/RX switch that is configured to provide time-division duplexing (TDD) functionality for the amplified B41 TX signal and the B41 RX signal.

In the example of FIG. 4, a controller 260 is shown to provide one or more control functionalities for the operation of the B41 amplification path 252. Further, the PA 256 is shown to be biased through a bias node 262. Such control and biasing functionalities can also be provided for the B39 amplification path 270.

In the example of FIG. 4, the ASM 292 is shown to allow routing of a path between the B39/B41 duplexer 264 and a common antenna 294. A carrier aggregation of the B39 and B41 bands in the foregoing example manner can achieve similar functionality as in the example of FIG. 2, but with a less component count, easier implementation, better performance, and a lower BoM cost.

Figure 5:
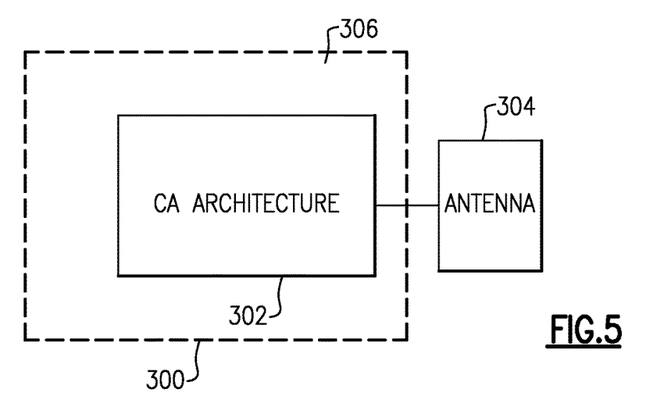
FIG. 5 is a schematic diagram of an example radio-frequency (RF) module including a front-end architecture according to some implementations.

FIG. 5 shows that in some implementations, one or more features of the present disclosure can be implemented in a radio-frequency (RF) module 300. While pertinent features are shown, those of ordinary skill in the art will appreciate from the present disclosure that various other features have not been illustrated for the sake of brevity and so as not to obscure more pertinent aspects of the example implementations disclosed herein. To that end, in some implementations, the RF module 300, such as a front-end module (FEM) or a power amplifier module (PAM) for an RF device (e.g., a wireless device), has a substrate 306 (e.g., a laminate substrate). The RF module 300 can include a carrier aggregation (CA) architecture 302 having one or more features as described herein (e.g., the configuration 200 of a front-end architecture in FIG. 3, or the configuration 250 of a front-end architecture in FIG. 4). In some implementations, the CA architecture 302 can be implemented on one or more semiconductor die. As also described herein, such a CA architecture 302 can provide CA functionalities with a common antenna 304.

In some implementations, the RF module 300 is an architecture, a device, and/or a circuit having one or more features described herein can be included in an RF device such as a wireless device. Such an architecture, a device and/or a circuit can be implemented directly in the wireless device, in one or more modular forms as described herein, or in some combination thereof.

Figure 6:
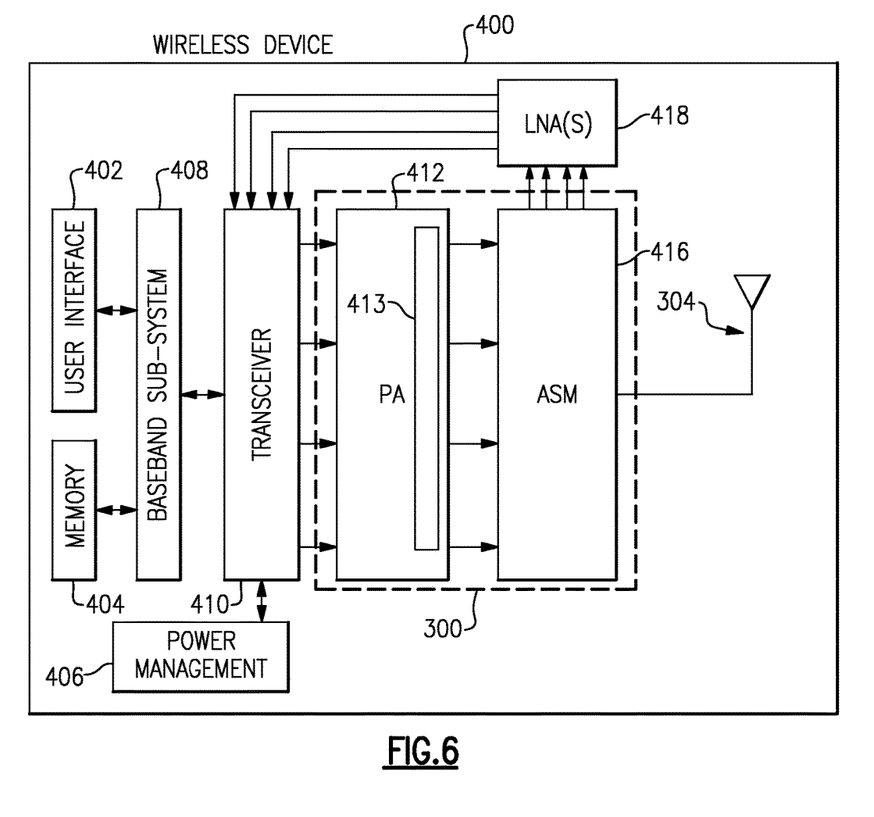
FIG. 6 is a schematic diagram of an example RF device including a front-end architecture according to some implementations.

FIG. 6 schematically depicts an example radio-frequency (RF) device 400 having one or more advantageous features described herein. While pertinent features are shown, those of ordinary skill in the art will appreciate from the present disclosure that various other features have not been illustrated for the sake of brevity and so as not to obscure more pertinent aspects of the example implementations disclosed herein. To that end, in some implementations, the RF device 400 is a wireless device. In some implementations, such a wireless device can include, for example, a cellular phone, a smart-phone, a hand-held wireless device with or without phone functionality, a wireless tablet, a wireless router, a wireless access point, a wireless base station, etc.

In some implementations the RF device 400 includes one or more PAs in a PA module 412 configured to receive their respective RF signals from a transceiver 410 that can be configured and operated in known manners to generate RF signals to be amplified and transmitted, and to process received signals. The transceiver 410 is shown to interact with a baseband sub-system 408 that is configured to provide conversion between data and/or voice signals suitable for a user and RF signals suitable for the transceiver 410.

The transceiver 410 is also shown to be connected to a power management component 406 that is configured to manage power for the operation of the RF device 400. Such power management can also control operations of the baseband sub-system 408 and other components of the RF device 400.

The baseband sub-system 408 is shown to be connected to a user interface 402 to facilitate various input and output of voice and/or data provided to and received from the user. The baseband sub-system 408 can also be connected to a memory 404 that is configured to store data and/or instructions to facilitate the operation of the wireless device, and/or to provide storage of information for the user.

In the example RF device 400, the PA module 412 can include one or more filters and/or one or more band/mode selection switches (collectively depicted as 413) configured to provide duplexing and/or switching functionalities as described herein. Such filters/switches 413 can be in communication with an antenna switch module (ASM) 416 having one or more features as described herein. In FIG. 6, some received signals are shown to be routed from the ASM 416 to one or more low-noise amplifiers (LNAs) 418. Amplified signals from the LNAs 418 are shown to be routed to the transceiver 410. According to some implementations, the PA module 412, the filters/switches 413, and/or the ASM 416 comprise at least a portion of the CA architecture 302 of the RF module 300 (e.g., the configuration 200 of a front-end architecture in FIG. 3, or the configuration 250 of a front-end architecture in FIG. 4).

A number of other wireless device configurations can utilize one or more features described herein. For example, the RF device 400 does not need to be a multi-band device. In another example, the RF device 400 can include additional antennas such as diversity antenna, and additional connectivity features such as Wi-Fi, Bluetooth, and GPS.

One or more features of the present disclosure can be implemented with various cellular frequency bands as described herein. Examples of such bands are listed in Table 1. It will be understood that at least some of the bands can be divided into sub-bands. It will also be understood that one or more features of the present disclosure can be implemented with frequency ranges that do not have designations such as the examples of Table 1.

TABLE 1

| Band | Mode | Tx Frequency Range (MHz) | Rx Frequency Range (MHz) |
|---|---|---|---|
| B1 | FDD | 1,920-1,980 | 2,110-2,170 |
| B2 | FDD | 1,850-1,410 | 1,930-1,990 |
| B3 | FDD | 1,710-1,785 | 1,805-1,880 |
| B4 | FDD | 1,710-1,755 | 2,110-2,155 |
| B5 | FDD | 824-849 | 869-894 |
| B6 | FDD | 830-840 | 875-885 |
| B7 | FDD | 2,500-2,570 | 2,620-2,690 |
| B8 | FDD | 880-915 | 925-960 |
| B9 | FDD | 1,749.9-1,784.9 | 1,844.9-1,879.9 |
| B10 | FDD | 1,710-1,770 | 2,110-2,170 |
| B11 | FDD | 1,427.9-1,447.9 | 1,475.9-1,495.9 |
| B12 | FDD | 699-716 | 729-746 |
| B13 | FDD | 777-787 | 746-756 |
| B14 | FDD | 788-798 | 758-768 |
| B15 | FDD | 1,400-1,920 | 2,600-2,620 |
| B16 | FDD | 2,010-2,025 | 2,585-2,600 |
| B17 | FDD | 704-716 | 734-746 |
| B18 | FDD | 815-830 | 860-875 |
| B19 | FDD | 830-845 | 875-890 |
| B20 | FDD | 832-862 | 791-821 |
| B21 | FDD | 1,447.9-1,462.9 | 1,495.9-1,510.9 |
| B22 | FDD | 3,410-3,490 | 3,510-3,590 |
| B23 | FDD | 2,000-2,020 | 2,180-2,200 |
| B24 | FDD | 1,626.5-1,660.5 | 1,525-1,559 |
| B25 | FDD | 1,850-1,915 | 1,930-1,995 |
| B26 | FDD | 814-849 | 859-894 |
| B27 | FDD | 807-824 | 852-869 |
| B28 | FDD | 703-748 | 758-803 |
| B29 | FDD | N/A | 716-728 |
| B30 | FDD | 2,305-2,315 | 2,350-2,360 |
| B31 | FDD | 452.5-457.5 | 462.5-467.5 |
| B33 | TDD | 1,400-1,920 | 1,400-1,920 |
| B34 | TDD | 2,010-2,025 | 2,010-2,025 |
| B35 | TDD | 1,850-1,410 | 1,850-1,410 |
| B36 | TDD | 1,930-1,990 | 1,930-1,990 |
| B37 | TDD | 1,410-1,930 | 1,410-1,930 |
| B38 | TDD | 2,570-2,620 | 2,570-2,620 |
| B39 | TDD | 1,880-1,920 | 1,880-1,920 |
| B40 | TDD | 2,300-2,400 | 2,300-2,400 |
| B41 | TDD | 2,496-2,690 | 2,496-2,690 |
| B42 | TDD | 3,400-3,600 | 3,400-3,600 |
| B43 | TDD | 3,600-3,800 | 3,600-3,800 |
| B44 | TDD | 703-803 | 703-803 |

For the purpose of description, it will be understood that "multiplexer," "multiplexing" and the like can include "diplexer," "diplexing" and the like.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While some implementations of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A carrier aggregation architecture comprising:
    a duplexer configured to provide duplexing functionality for a first frequency band and a second frequency band with a common antenna; and
    a first amplification path associated with the first frequency band and a second amplification path associated with the second frequency band coupled to respective ports of the duplexer, each of the first amplification path and the second amplification path configured to amplify a signal in its respective frequency band, the first amplification path including a first transmit/receive switch configured to provide time-division duplexing functionality for an amplified signal in the first frequency band and a received signal in the first frequency band, the first transmit/receive switch implemented within a first band-selection switch of the first amplification path, the second amplification path including a second transmit/receive switch configured to provide time-division duplexing functionality for an amplified signal in the second frequency band and a received signal in the second frequency band, each of the first transmit/receive switch and the second transmit/receive switch including a common node coupled to the duplexer for transmitted and received signals, the first amplification path further configured to amplify a signal in a third frequency band, the first transmit/receive switch configured to route an amplified signal in the third frequency band to a filter.

2. The carrier-aggregation architecture of claim 1 wherein the first frequency band includes a B39 band.

3. The carrier-aggregation architecture of claim 1 wherein the second frequency band includes a B41 band.

4. The carrier-aggregation architecture of claim 1 further including an antenna switch module coupled to a node of the duplexer.

5. The carrier-aggregation architecture of claim 1 wherein the second amplification path includes a second band-selection switch.

6. The carrier-aggregation architecture of claim 1 wherein the first amplification path includes a controller configured to provide one or more control functionalities for the operation of the first amplification path.

7. The carrier-aggregation architecture of claim 1 wherein the first amplification path includes a power amplifier and a bias port configured to bias the power amplifier.

8. A radio-frequency module comprising:
    a packaging substrate configured to receive a plurality of components; and
    a carrier aggregation architecture implemented on the packaging substrate, the carrier-aggregation architecture including a duplexer configured to provide duplexing functionality for a first frequency band and a second frequency band with a common antenna, the carrier-aggregation architecture further including a first amplification path associated with the first frequency band and a second amplification path associated with the second frequency band coupled to respective ports of the duplexer, each of the first amplification path and the second amplification path configured to amplify a signal in its respective frequency band, the first amplification path including a first transmit/receive switch configured to provide time-division duplexing functionality for an amplified signal in the first frequency band and a received signal in the first frequency band, the first transmit/receive switch implemented within a first band-selection switch of the first amplification path, the second amplification path including a second transmit/receive switch configured to provide time-division duplexing functionality for an amplified signal in the second frequency band and a received signal in the second frequency band, each of the first transmit/receive switch and the second transmit/receive switch including a common node coupled to the duplexer for transmitted and received signals, the first amplification path further configured to amplify a signal in a third frequency band, the first transmit/receive switch configured to route an amplified signal in the third frequency band to a filter.

9. The radio-frequency module of claim 8 wherein the radio-frequency module is a power amplifier module.

10. The radio-frequency module of claim 8 wherein the radio-frequency module is a front-end module.

11. The radio-frequency module of claim 8 wherein the first frequency band includes a B39 band and the second frequency band includes a B41 band.

12. The radio-frequency module of claim 8 wherein the second amplification path includes a second band-selection switch.

13. A radio-frequency device comprising:
    a transceiver configured to process radio-frequency signals; and
    a radio-frequency module in communication with the transceiver, the radio-frequency module having a carrier aggregation architecture, the carrier-aggregation architecture including a duplexer configured to provide duplexing functionality for a first frequency band and a second frequency band with a common antenna, the carrier-aggregation architecture further including a first amplification path associated with the first frequency band and a second amplification path associated with the second frequency band coupled to respective ports of the duplexer, each of the first amplification path and the second amplification path configured to amplify a signal in its respective frequency band, the first amplification path including a first transmit/receive switch configured to provide time-division duplexing functionality for an amplified signal in the first frequency band and a received signal in the first frequency band, the first transmit/receive switch implemented within a first band-selection switch of the first amplification path, the second amplification path including a second transmit/receive switch configured to provide time-division duplexing functionality for an amplified signal in the second frequency band and a received signal in the second frequency band, each of the first transmit/receive switch and the second transmit/receive switch including a common node coupled to the duplexer for transmitted and received signals, the first amplification path further configured to amplify a signal in a third frequency band, the first transmit/receive switch configured to route an amplified signal in the third frequency band to a filter.

14. The radio-frequency device of claim 13 wherein the radio-frequency device includes a wireless device.

15. The radio-frequency device of claim 14 wherein the wireless device is a cellular phone.

16. The radio-frequency device of claim 13 wherein the first frequency band includes a B39 band and the second frequency band includes a B41 band.

17. The radio-frequency device of claim 13 wherein the second amplification path includes a second band-selection switch.

* * * * *